Patented Dec. 12, 1933

1,939,600

UNITED STATES PATENT OFFICE 1,939,600

MUSHROOM SPAWN AND SUBSTRATE THEREFOR

Granville Raymond Rettew, West Chester, Pa., assignor to Joseph W. Strode, Floyd W. Divine, and Granville Raymond Rettew, trading as Chester County Mushroom Laboratories, West Chester, Pa.

No Drawing. Application December 6, 1932
Serial No. 645,945

16 Claims. (Cl. 47—1)

This invention relates to mushroom spawn and substrate therefor. By the invention, various advantages in spawn production can be realized, such as reduced cost of the substrate material and its preparation; great reduction in the time and trouble of preparation; easier inoculation of the substrate with culture or "original"; more rapid growth and spreading of the mycelium in the substrate; adaptation of the spawn to various modes of planting, as by breaking into small pieces and planting at intervals, or by reducing to much finer particles and sowing broadcast; greater vigor of the spawn; and quicker growth of the spawn after planting in the mushroom beds. Moreover, the spawn can be very effectively protected against insect pests, which may (and more usually do) attack it in the beds, greatly damaging it and reducing its yield, and may also attack the original inoculation in the substrate or culture medium, causing even greater damage and ultimate loss.

How these and other advantages can be realized through the invention will appear from the description hereinafter of illustrative and presently preferred forms of embodiment.

In the production of spawn as generally practiced at the present time, manure from horses bedded with wheat or rye straw is generally used as a culture-medium or substrate. For this purpose, such manure is piled and composted, with weekly turning over, for a period of some three weeks, or until it has lost its fecal odor and attained the right consistency, etc. It is thoroughly washed with water, dried, and cut up in a hammer mill, and then moistened to the proper degree for spawn growing. It is charged into bottles or containers of convenient size (such as the forty-ounce milk bottle), by means of a funnel and stick, etc., and a central hole is bored through the charge in each bottle. A temporary plug of cotton-wool is inserted in the top of the hole, and the bottles are sterilized in a steam sterilizer for about four hours. When cool, they are removed from the sterilizer under strictly sterile conditions, and each bottle charge is inoculated with a culture from carefully prepared germinated spores, by placing one piece of this culture or "original" in the hole near the bottom of the bottle, and another near its top; and in the mouth of the bottle or container is inserted a plug of cotton-wool, all with almost surgical precautions against contamination with foreign organisms. The bottles are then placed in a growing room and kept at a temperature of about 70° F. until the growth of mycelium through the manure of each bottle is complete, which usually requires about 28 days, and is determined by inspection of the bottles from time to time.

Instead of milk-bottles may be used straight-sided cylindrical containers with screwed-on nozzle caps whose necks take the protective plug of cotton-wool, as described in my pending application, Serial No. 594,041, filed February 19, 1932.

The "spawn" (as the mycelium-permeated manure is called) is now ready to pack and ship to the mushroom grower. Or if shipment is to be deferred for any reason, it is kept in cold storage at a temperature of some 32–34° F. For planting, the spawn is broken into small pieces, which are separately implanted in the mushroom beds, at intervals of about 10 in. apart. This is done by lifting manure from the bed with the thumb, inserting a piece of spawn about the size of a walnut, and covering it over thoroughly.

I have found that by using a different culture-medium or substrate instead of manure, the process of spawn production can be modified and greatly improved, as hereinbefore indicated. The substrate which I employ comprises a mixture of tobacco stems and humus, such as peat, peat moss or sphagnum, all in about the usual moist state of manure as heretofore used. It is quite desirable that the stems be in a properly moist, fully swelled state when the substrate is used: accordingly, the usual dried stems of commerce may be soaked with water until completely swelled, before intermixture with the humus. The mixture should be substantially or approximately neutral in reaction, and may be rendered so by treatment with hydrated lime or limestone, or by addition thereto of these or other suitable alkalies in suitable proportions. To help maintain the substrate properly moist, a suitable small proportion of starch may be added, such as potato starch, rice starch, corn starch, etc., if climatic or seasonal conditions of the atmosphere render it advisable.

While the proportions of the ingredients may vary over a rather wide range, the greatest advantage is generally realized when the relative proportions of stems and humus are such as to give the substrate the following properties: i. e., when charged into the bottles or other containers substantially as above described, without being tightly packed in them, it should be loose and incohesive, so that the inoculating culture can be placed in the bottom of a charge with a pair of tongs without drilling a hole in the charge, as is necessary in a charge of manure; but after the spawn has fully developed and permeated the charge, then it should be cohesive enough to be removed from the container as a unit and broken into pieces of suitable size for planting as above described. In these seemingly opposed properties of the substrate, the humus appears to play a dual rôle; initially, it acts as a cushion or "dry lubricant" amongst the particles of stem, leaving them loose and even preventing them from interlacing or binding together before inoculation and mycelium growth; subsequently, it acts as a bridge and a filling or binder between stem particles for and after mycelium growth, and assists the grown mycelium in binding the whole mass into sufficient cohesion for handling. An illustrative preferred formula of proportions of ingredients for the substrate is as follows:

Washed and soaked tobacco stems, prepared as above described, and weighed after their last (second) draining _____ 600 pounds
Humus (peat) _____ 200 pounds
Potato starch _____ 16 pounds
Hydrated lime, to bring reaction to pH 7.00.

After inoculation and incubation in a bottle or container, such a substrate gives a unit of spawn which is not only cohesive enough to be removed from the container intact, handled, packed, and shipped, and broken into walnut-size pieces for planting, but also friable enough to be easily broken into small fragments or particles at almost a single blow, permitting it to be planted by sowing it broadcast.

In preparing the substrate, dried tobacco stems, in suitable small pieces, are preferably treated with boiling hot water until completely swelled, which usually takes about two hours when the water is kept about boiling hot the whole time. This water is then poured or drained off and replaced with fresh boiling hot water, in which the stems are allowed to soak for two hours more. Then this water is drained off completely, and the thus soaked and washed material is thoroughly mixed with the humus in any convenient way. The mixture is treated with hydrated lime or limestone sufficiently to bring its reaction within a range of pH 7.9 to 6.2, and preferably in the narrower range of pH 7.2 to 6.8. Then the starch (if used) is added and thoroughly mixed in, and the moisture content is suitably adjusted, usually by mixing in additional water.

Such a substrate, containing the proper moisture, is charged into the containers and sterilized therein as above described. It is not, however, drilled after charging: on the contrary, the inoculating culture is simply introduced with a pair of tongs by pushing through the loose substrate, one piece of culture being placed in the midst of each charge near the bottom, another near the top. The containers are then placed in the growing room and incubated there at about 65 to 75° F. until the particles of each charge are all completely over-run with mycelium. The period of incubation may be much shorter than for manure spawn, however, owing to the more rapid "running" or spread of the spawn in my substrate: e. g., the time in the growing room may be reduced by from one to two weeks as compared with that required for manure spawn. After full growth, the spawn-filled containers may be kept in cold storage at 32 to 35° F. until wanted. The spawn may either be shipped to the mushroom grower in these same containers, or it may be removed and suitably packaged for delivery or shipment, as by wrapping it in parchment paper, or placing it in some suitable shipping container.

The grower may either plant the spawn by breaking it into pieces of about walnut size and planting them ten inches apart, like manure-spawn; or he may break it up into small particles and sow them broadcast, or in rows like radish or carrot seed, either by hand or with a seed drill, covering them over to a depth of about two inches.

The tobacco stems in my culture medium are not only good absorbents of water and good food for the growth of the mycelium, but are also repellant to insects, so as to protect the spawn against trouble from larvæ of fungus gnats, mites, springtails, or other pests which eat mushroom spawn. Being pre-swollen with water, the stems render the substrate very uniformly moist, and do not swell in the containers, so as to bind the substrate and require shaking of the containers to loosen the substrate for inoculation.

The humus not only holds water well, but helps to keep the substrate loose until after inoculation. When, moreover, the mycelium starts to grow, the humus acts as a "bridge" between the small stem particles for the more rapid running of the mycelium, so that the latter pervades the substrate uniformly all through much more quickly. Indeed, spawn runs much faster on humus than it does on manure, for example; so that it is never necessary to hold spawn in incubation to wait for growth in some portions to overtake that in the rest. When, on the other hand, the mycelium has run all through the substrate, the humus assists in "binding" it, so that it will hold its shape and can be removed whole from the containers, and afterward handled and broken into cohesive pieces for planting. The spawn also keeps better before planting than that grown in manure or cereal, because of the more uniform distribution of moisture maintained by the humus as well as by the stems, and of the freedom from sweating and collection of moisture in the bottom of the containers. The humus also prevents the development of tight masses of mycelium in the substrate.

After planting, the humus acts as a bridge between the substrate particles and the manure of the mushroom bed, so that the spawn does not have a gap to bridge before it can start to run in the manure. Also, the tobacco stems prevent insects from attacking the spawn as soon as planted; so that when insects have been discovered, and have been eliminated, the spawn is still in good condition to inoculate the beds. Quick inoculation of the beds minimizes the time in which insects and molds may develop and start to prey upon or injure the spawn.

My substrate is, furthermore, less costly than one of manure, because of the longer and more elaborate preparation that manure must undergo.

In the preparation of my substrate, other similar stems, high in nitrogen content, may be substituted for the tobacco stems, in whole or in part, without impairing many of the advantages of the substrate. Nor is my substrate impaired by the presence therein of other materials themselves suitable for spawn culture, such as manure or wheat, rye, or other cereals, which latter, indeed, are generally present in substantial proportions in horse manure. While many stems and other materials lack the insecticidal or insect-repellant properties of tobacco stems, which afford valuable protection against fungus gnats, mites, and springtails, yet this can be compensated for by soaking the dried stems and other substances in hot solutions of water-soluble insecticides, such as (or containing) pyrethrum, rotenone, or nicotine, or their derivatives, instead of soaking them in mere hot water, as above described. In such cases, a single soaking for some two to four hours may suffice: i. e., the second soaking in a second supply of hot water may be dispensed with. Water-soluble insecticide preparations of rotenone and of pyrethrum are well known commercially: see, for example, the Journal of the American Chemical Society, Vol. 52, No. 6, page 2560, and the Journal of Economic Entomology, Vol. 24, No. 1, page 268.

Having thus described my invention, I claim:

1. A substrate for growing mushroom spawn comprising a moist mixture of nitrogenous plant stems and humus, substantially neutral in reaction.

2. A substrate for growing mushroom spawn comprising a moist mixture of nitrogenous plant stems and humus together with a moisture-maintaining agent, all as a whole substantially neutral in reaction.

3. A substrate for growing mushroom spawn comprising a moist mixture of nitrogenous plant stems and humus, containing insecticidal properties and substantially neutral in reaction.

4. A process of preparing a substrate mixture of nitrogenous plant stems and humus for mushroom spawn growing, which process comprises water-soaking and swelling the plant stems before mixture with the humus, and substantially neutralizing the mixture.

5. A substrate for growing mushroom spawn comprising a moist mixture of nitrogenous plant stems with a proportion of cushioning material sufficient to bridge the gaps between stem particles for mycelium growth while keeping the mixture loose for easy inoculation, said substrate containing insecticidal properties and being substantially neutral in reaction.

6. A mushroom spawn having a substrate substantially neutral in reaction and comprising nitrogenous plant stems containing insecticidal properties mixed with a cushioning medium whereby the spawn is bound into sufficient cohesion to be handled whole and broken apart for planting in pieces, while yet rendered friable enough to be easily broken into fine fragments for sowing broadcast.

7. A substrate for growing mushroom spawn comprising a moist mixture of tobacco stems and humus, substantially neutral in reaction.

8. A substrate for growing mushroom spawn comprising a moist mixture of tobacco stems and humus together with a moisture-maintaining agent, all substantially neutral in reaction.

9. A substrate for growing mushroom spawn, comprising a moist mixture of tobacco stems with a proportion of humus sufficient to bridge the gaps between stem particles for mycelium growth while leaving the mixture loose for easy inoculation.

10. A substrate for growing mushroom spawn comprising a moist mixture of tobacco stems and humus in substantially the proportions of three to one, respectively, substantially neutral in reaction.

11. A process of preparing a substrate mixture of tobacco stems and humus for mushroom spawn growing, which process comprises water-soaking and swelling the tobacco stems before mixture with the humus, and substantially neutralizing the mixture with alkali.

12. A process of preparing a substrate mixture of highly nitrogenous plant stems and humus for mushroom growing, which process comprises water-soaking and swelling the stems and also soaking them with water-soluble insecticide, before mixture with the humus, and substantially neutralizing the mixture with alkali.

13. A substrate for growing mushroom spawn comprising water-swelled tobacco stems mixed with humus, substantially neutral in reaction.

14. A substrate for growing mushroom spawn comprising water-swelled tobacco stems mixed with a minor proportion of humus, substantially neutral in reaction.

15. A substrate for growing mushroom spawn comprising water-swelled tobacco stems mixed with a minor proportion of humus and a small percentage of moisture-maintaining starch, the whole substantially neutral in reaction.

16. A mushroom spawn having a substrate of tobacco stems and humus, and cohesive enough to be handled whole and broken apart for planting in pieces, yet friable enough to be easily broken up into fine fragments for sowing broadcast.

GRANVILLE RAYMOND RETTEW.